No. 746,713. PATENTED DEC. 15, 1903.
R. H. LANGSTON.
FERTILIZER DISTRIBUTER.
APPLICATION FILED MAY 29, 1903.
NO MODEL. 2 SHEETS—SHEET 1.

Witnesses:
F. L. Ourand
J. E. Lambert

Inventor.
R. H. Langston
By Attorney
J. S. Duffie

No. 746,713. PATENTED DEC. 15, 1903.
R. H. LANGSTON.
FERTILIZER DISTRIBUTER.
APPLICATION FILED MAY 29, 1903.
NO MODEL. 2 SHEETS—SHEET 2.
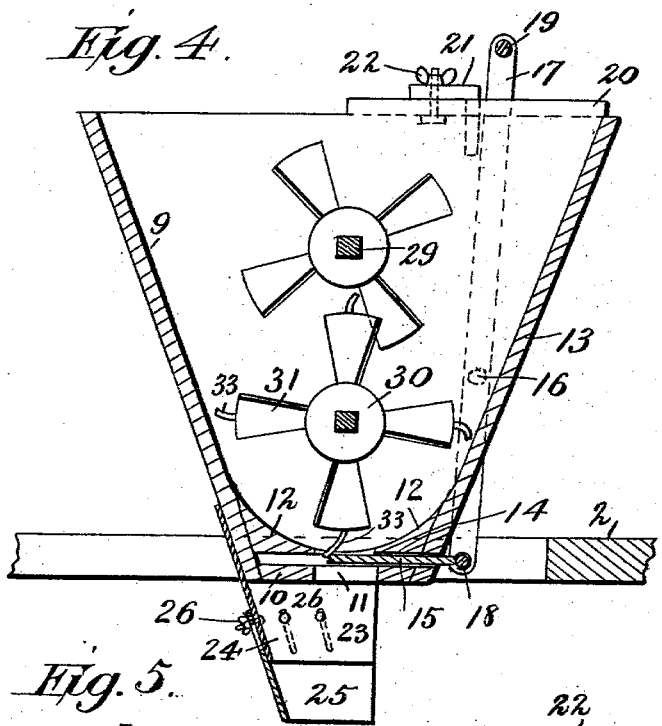
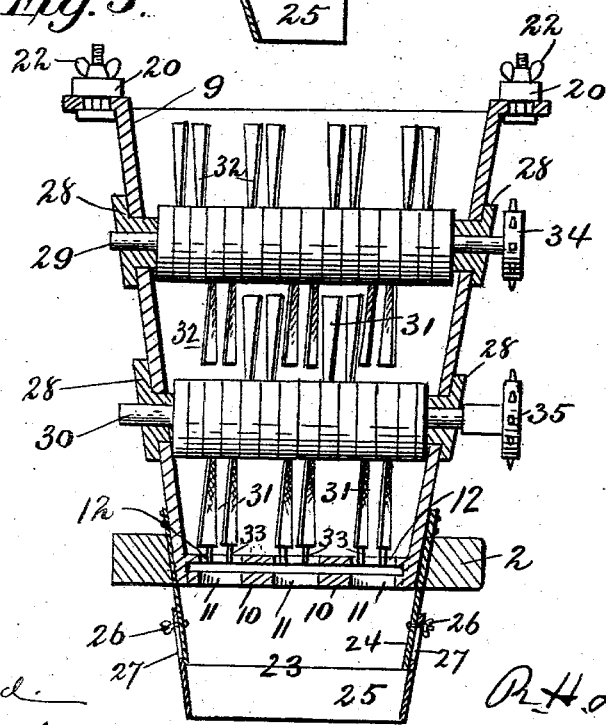
WITNESSES
INVENTOR No. 746,713. Patented December 15, 1903.

UNITED STATES PATENT OFFICE.

RICHARD H. LANGSTON, OF EBENEZER, SOUTH CAROLINA.

FERTILIZER-DISTRIBUTER.

SPECIFICATION forming part of Letters Patent No. 746,713, dated December 15, 1903.

Application filed May 29, 1903. Serial No. 159,277. (No model.)

*To all whom it may concern:*

Be it known that I, RICHARD H. LANGSTON, a citizen of the United States, residing at Ebenezer, in the county of Florence and State of South Carolina, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to fertilizer-distributers; and it consists in a frame, bearing-wheels, and covering-plows, a hopper seated in said frame, and means for agitating the fertilizer and forcing it through the apertures in the bottom of the hopper.

Figure 1:
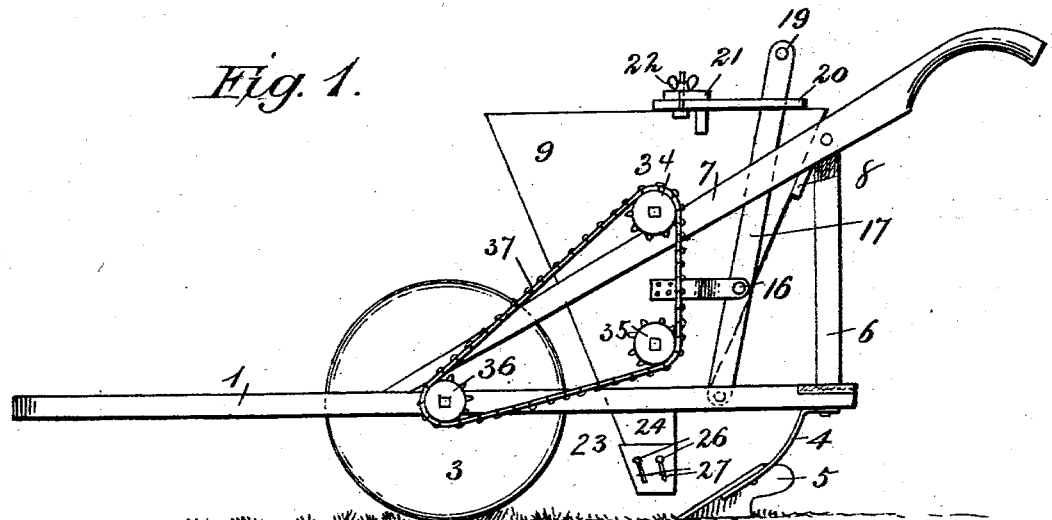
Figure 2:
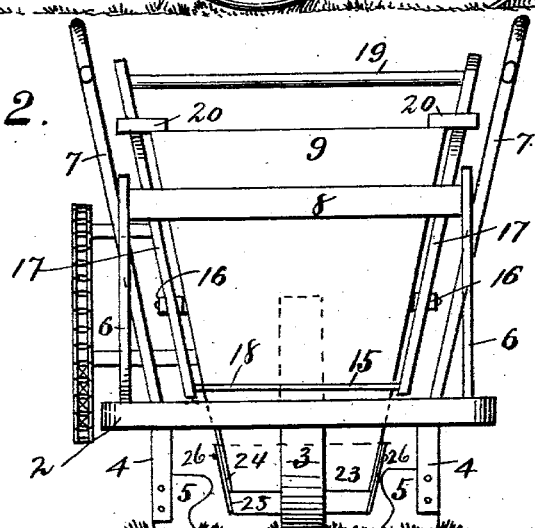
Figure 3:
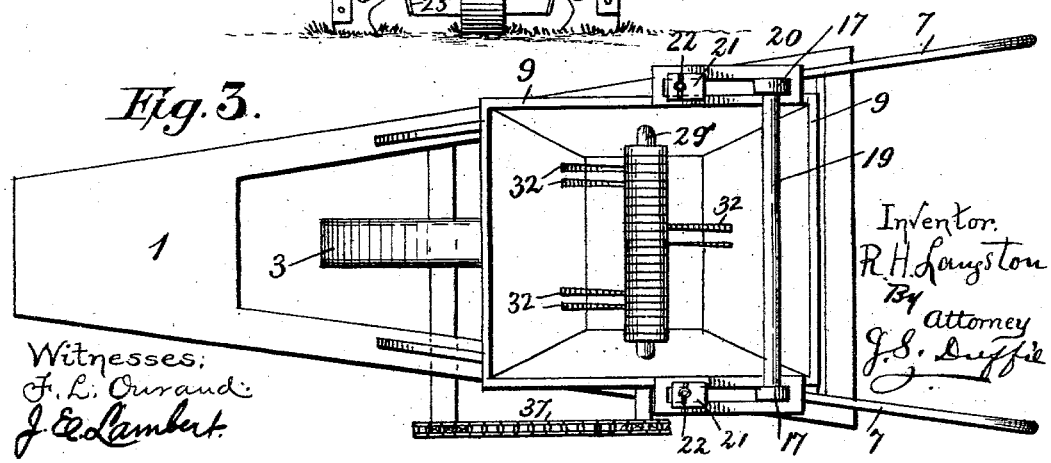

In the accompanying drawings, Figure 1 is a side elevation of my invention. Fig. 2 is a rear end view. Fig. 3 is a top plan view. Fig. 4 is a detail sectional view showing the hopper and the shut-off slide in section and the ends of the stirrers, and Fig. 5 is a detail vertical section showing the hopper and the chute in section and showing the stirrers in rear elevation.

My invention is described as follows:

1 represents the side pieces of the frame, which come practically to a point at the front end of the machine.

2 represents the rear cross-beam; 3, the bearing-wheel. There may be but one bearing-wheel or there may be two, if desired.

4 represents the plow-standards, which may be made of any desired shape and of any length. 5 represents the plows attached to said standards, which may also be made of any desired shape and size.

Secured to and rising from each end and upper face of the rear cross-beam 2 are two standards 6, and to these standards and to the said beam 1 are attached handles 7. The said standards 6 are connected by a cross-beam 8 at their upper ends. Seated between the two side beams 1 is a hopper 9. Secured in the lower end of said hopper is a bottom 10, provided with three longitudinal openings 11, and secured in the lower end of the said hopper and running crosswise of the same are two triangular pieces 12, their lower angle exactly angled to fit in the form made by the front and rear walls of the hopper and the said bottom, their long side made circular to conform to the periphery of the lower stirrer, thus inclining the fertilizer to the longitudinal perforations 11. The rear wall 13 of the hopper does not extend down as low as the end and side walls nor quite to the upper face of the bottom 10, thus leaving a slot 14 between the lower end of said rear wall and the bottom of the said hopper, and working back and forth in this slot is a shut-off slide 15, which reaches all the way across the bottom of the hopper and far enough forward to completely close the said longitudinal slots and prevent the fertilizer from escaping, except when it is pulled back.

Pivoted on fulcrum-rods 16, one on each side of the hopper, are levers 17, and in the lower ends of these levers is secured a cross-rod 18, and to the lower end of this cross-rod is secured the rear end of the shut-off slide 15. The upper ends of said levers extend a little above the upper end of the hopper and are secured together by a cross-rod 19. Secured on the upper edge, one on each side wall of the hopper and near the rear edges thereof, are two slotted pieces 20, and through the slots of said pieces work backward and forward the upper ends of said levers 17, and thus the said shut-off slide 15 is made to move backward and forward and close and open the longitudinal perforations 11. The swing of the upper ends of said levers 17 is regulated by a stop 21, one working in the slot of each of the slotted pieces 20. Said stops are set at a greater or less distance from the ends of the slots by thumb-screws 22, one in each slot, and thus the flow of the fertilizer is regulated, as the swing of the upper ends of said levers regulates the swing of the lower ends thereof, and consequently the play of the shut-off slides. The particular construction of these said cross-pieces is very important, because fertilizers are often very much wasted when the machine is making the turn at the end of the row, or in going from place to place, and when I come to the end of a row I simply place my foot against the cross-piece 18 and push the shut-off slide 15 in or take hold of the cross-rod 19 and pull it back, which performs the same operation, and thus I lose no fertilizer at the ends of the rows or the troughs, and if I desire to go a great distance I may move the adjustable stops 21 back and hold the levers 17 permanently in place until I am at the end of my journey.

Secured to the bottom of the hopper is an apron 23. This apron consists of two parts, an upper part 24 and a lower part 25. The upper part is provided with thumb-screws 26 and the lower part with corresponding slots 27, so that said apron may be lengthened or shortened, as desired. The purpose of this apron is to keep the fertilizer from being blown out of the course in which I wish it to fall.

Secured in the side walls of the hopper, one above the other, are bearings 28, and journaled in these bearings are stirrers 29 and 30. Their axles are cylindrical at the points where they are journaled in the bearings; but where their blades are secured they are square. The blades 31 of the lower stirrer are inclined with their lower edges to the right, so that when they turn forward the fertilizer is moved to the left, and the arms 32 of the upper stirrer have their lower edges inclined to the left, so that the fertilizer operated by that stirrer is moved to the right. Consequently the fertilizer is kept constantly moving from the left to the right and is thus kept perfectly stirred up, broken up, and separated, so that it will pass through the elongated perforations; but it sometimes happens that the fertilizer will be a little damp and inclined to clog in the elongated openings, and to prevent that I have to provide the ends of the blades which pass immediately over the elongated openings with brushes 33, which pass down into said elongated openings and keep them cleaned out. These brushes may be permanently or removably attached to the blades and may be made of any flexible material and may be used or not, as the condition of the fertilizer may require.

Secured to the outer ends of the axles of the stirrers 29 and 30 and to the outer end of the axle of the wheel 3 are sprocket-wheels 34, 35, and 36, and working over these three sprocket-wheels is a sprocket-chain 37, the purpose of which is unnecessary to explain.

Having described my invention, what I claim as new, and desire to secure by Letters Patent, is—

1. A fertilizer-distributer consisting of a frame suitably mounted; a hopper secured in said frame, having in its bottom longitudinal openings; angle-pieces in the bottom of said hopper; a shut-off slide operating through the back part of the hopper and adapted to close said openings; levers pivoted to the sides of said hopper and to said shut-off and adapted to operate the same; slotted pieces, one secured on the top of each of the side walls of the hopper, through which the upper ends of said lever pass; stops adjustably secured, one in each of said slotted pieces; stirrers journaled in said hopper, the blades of the lower stirrer inclined to drive the fertilizer to the left and the blades of the upper stirrer inclined to drive the fertilizer to the right, substantially as shown and described and for the purposes set forth.

2. A fertilizer-distributer consisting of a frame suitably mounted; a hopper secured in said frame, having in its bottom longitudinal openings; angle-pieces in the bottom of said hopper; a shut-off slide operating through the back part of the hopper and adapted to close said openings; levers pivoted to the sides of said hopper and to said shut-off and adapted to operate the same; slotted pieces, one secured on the top of each of the side walls of the hopper, through which the upper ends of said lever pass; stops adjustably secured, one in each of said slotted pieces; stirrers journaled in said hopper and the blades of the lower stirrer inclined to drive the fertilizer to the left and the blades of the upper stirrer inclined to drive the fertilizer to the right; brushes secured to the ends of said blades and adapted to pass through said longitudinal openings, substantially as shown and described and for the purposes set forth.

3. A fertilizer-distributer consisting of a frame suitably mounted; a hopper secured in said frame, having elongated openings in its bottom; angle-pieces in the bottom of said hopper shaped to incline the fertilizer to said openings; a shut-off adapted to close said openings; levers, one pivoted to each side of the hopper and to said shut-off; a rod connecting the upper ends of said levers; slotted pieces, one secured to each of the side walls of said hopper through the slots of which the upper ends of said levers pass; stops adjustably secured in said slotted pieces; stirrers journaled in said hopper operated by suitable mechanism; an adjustable apron consisting of two parts secured below the bottom of said hopper, substantially as shown and described and for the purposes set forth.

In testimony whereof I affix my signature in presence of two witnesses.

RICHARD H. LANGSTON.

Witnesses:
J. L. WILLIAMS,
L. ANDERSON.